Dec. 8, 1942.   H. A. BACKUS   2,304,392
FILM DRIVING MECHANISM
Filed Aug. 29, 1941
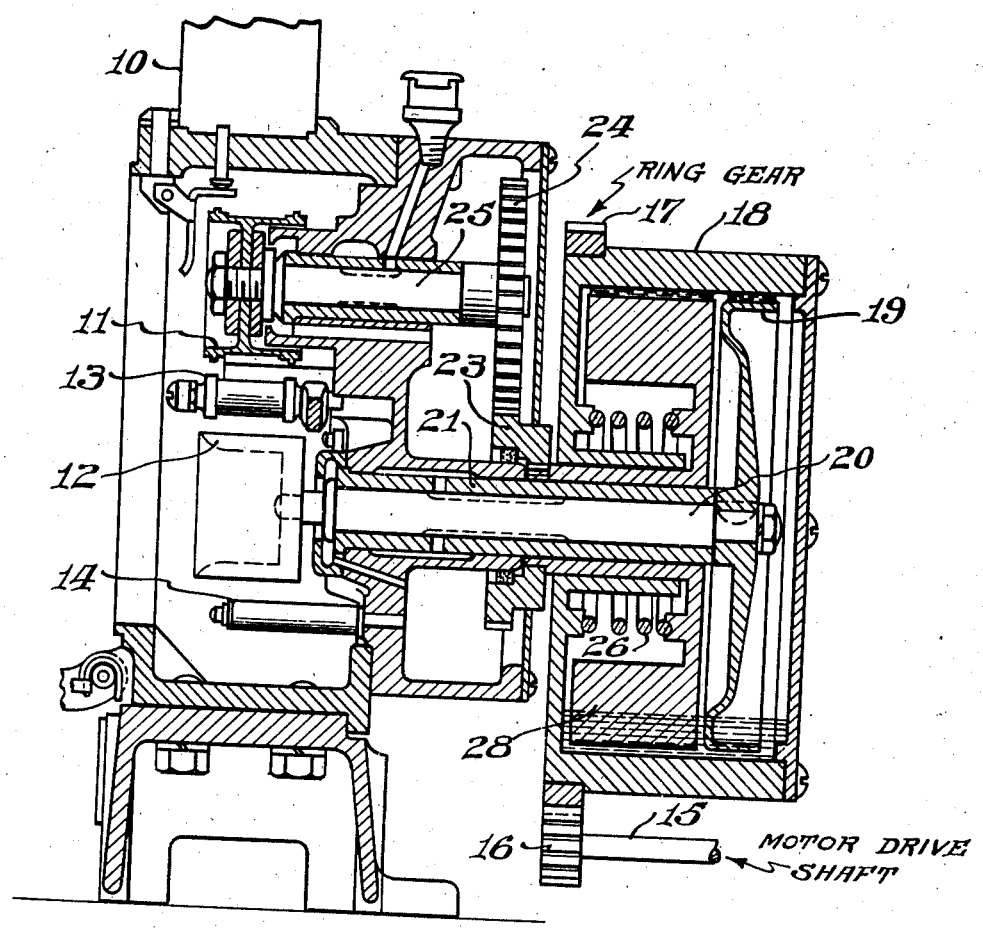
Inventor
Harold A. Backus
By
Attorney Patented Dec. 8, 1942

2,304,392

UNITED STATES PATENT OFFICE 2,304,392

FILM DRIVING MECHANISM

Harold A. Backus, Merion, Pa., assignor to Radio Corporation of America, a corporation of Delaware Application August 29, 1941, Serial No. 408,750

1 Claim. (Cl. 271—2.3)

This invention relates to film driving mechanism and is an improvement on the apparatus described and claimed in Kellogg patents Reissue 19,270, 1,899,571 and 1,969,755. The apparatus described in the said Kellogg patents involves a film drum which is driven through a continuously and aperiodically yieldable connection which causes a very uniform movement of the film past a recording or reproducing point, while the average speed of the film is determined by a positively driven sprocket.

The apparatus is usually driven by a synchronous motor or an equivalent device and, as a consequence, the sprocket is brought rapidly to speed, while an appreciable time elapses before the film drum reaches the corresponding speed. This operation occasions the loss of a certain amount of film each time the apparatus is started, as recording cannot commence until the film reaches a uniform speed.

The present apparatus improves on that of the said patents in that the film drum is more rapidly accelerated, whereas the sprocket is provided with a drive mechanism which delays its acceleration, so that the sprocket and film drum reach the proper speed substantially simultaneously. The sprocket drive is so constructed that, although the acceleration is delayed, nevertheless the drive is substantially synchronous during normal operating conditions and the yieldable portion of the drive is critically damped so that no oscillation will occur.

One object of the present invention is to provide an improved film driving mechanism, Another object of the invention is to provide a film driving mechanism which will prevent loss of film in the starting of the apparatus, Another object of the invention is to provide a film driving mechanism having a synchronous sprocket drive and a yieldable drum drive in which both the sprocket drive and drum drive are filtered.

Other and incidental objects of the invention will be apparent to those skilled in the art from a reading of the following specification and an inspection of the accompanying drawing in which The single figure of the drawing is a vertical section through a film driving device constructed in accordance with the invention, the particular device shown being usable either as a recorder or a film phonograph.

Film from the magazine 10 passes downwardly around the sprocket 11 around the film drum 12 and back to the magazine 10, being guided by the idler roller 14 and being maintained in contact with the film drum 12 by the pressure roller 13. The pressure roller 13 may be constructed, if desired, as shown and described in Kellogg Patent 1,899,571.

Power is supplied to the apparatus through the drive shaft 15 and the pinion 16, which drive the ring gear 17 on the outside of the drive casing 18. Any equivalent form of drive may be used as, for example, a low-speed motor may be directly coupled to the member 18 or a friction or belt drive might be used. The casing 18 is preferably rather massive in order to stabilize the drive from the motor or other drive means.

Within the casing 18 there is provided a rotatable coupling member 19 which may be relatively light and is coupled to the casing 18 by means of an appropriate viscous fluid such, for example, as oil of proper viscosity. The member 19 is carried on the shaft 20, which carries the film drum 12 upon its other end, and the drum 12 is, accordingly, driven through the member 19, which, due to its lightness, will accelerate very rapidly.

The shaft 20 is carried within the fixed bushing 21. Within the casing 18, there is carried a flywheel member 28 which rotates on the exterior of the bushing 21 and carries the gear 23 which is suitably connected to the flywheel member 28 so as to rotate therewith. The gear 23 drives the gear 24 on the sprocket shaft 25 so that the sprocket 11 is maintained in fixed relation to the flywheel 28. The flywheel 28 is coupled to the casing 18 by the viscous fluid in the same manner as the member 19. It is necessary for the sprocket 11 to rotate at a speed which is positively determined by the rotational speed of the driving member and in order to accomplish this the flywheel 22 is connected to the casing 18 by an appropriate spring 26. When the driving mechanism is started the coupling member 19 is brought up to speed considerably more rapidly than in the Kellogg devices with, of course, the sacrifice of a certain amount of filtering but the film drum 12 does not reach operating speed instantaneously. As the driving member 19 is being accelerated the mass of the flywheel 28 tends to retard its acceleration until the spring 26 has been placed under appreciable torque. The flywheel 28 accelerates and due to the torque of the spring 26 reaches a speed slightly above the normal running speed which, of course, assists in the acceleration of the drum 12. However, as soon as the flywheel 28 has exceeded the speed of the driving member 18 the viscous fluid within the member 18 tends to retard the flywheel 28 and to bring it back to the proper speed, while at the same time damping any tendency toward oscillation of the flywheel 28. As a consequence of these several actions, the sprocket 11 and the film drum 12 are promptly brought to the normal running speed without periodic oscillation.

It will be apparent that the filtering accomplished by the fluid drive to the coupling member 19 is not as effective as the filtering accomplished in either of the Kellogg patents above referred to. This disadvantage is, however, offset to a considerable extent by the fact that the drive to the sprocket 11 is well filtered and any irregularities in the motion of the driver are accordingly prevented from reaching the sprocket 11. The only remaining irregularity which the sprocket 11 may tend to impart to the film is that which is due to the sprocket tooth spacing and the sprocket hole spacing in the film and the filtering applied to the film drum is sufficient to eliminate this irregularity.

It will be understood, of course, that this device is operated under the same conditions as either the apparatus of Kellogg Reissue Patent 19,270 or Kellogg Patent 1,899,571 in each of which filtering is accomplished at each side of the film drum through the flatwise elasticity of the film. It will be apparent that this filtering might be accomplished through the use of light springs or sprung idlers in contact with the film between the sprocket and the film drum but these expedients have both elasticity and mass which tends to give them an oscillatory motion which is not as satisfactory as the use of the film itself for filtering.

Although the invention has been described with particular reference to a viscous drive to the film drum and viscous damping of the sprocket drive, it will be apparent that other equivalent constructions may be used.

I claim as my invention:

Film driving means including means for carrying a film at a uniform speed past a translation point, means for feeding film to and from said means at a predetermined average speed, continuously and aperiodically yieldable viscous means driving said film carrying means, resiliently yieldable means driving said feeding means, and viscous damping means on said resiliently yieldable means.

HAROLD A. BACKUS.